(12) United States Patent
Li et al.

(10) Patent No.: US 11,722,045 B2
(45) Date of Patent: Aug. 8, 2023

(54) VOICE COIL MOTOR

(71) Applicant: TRIPLE WIN TECHNOLOGY(SHENZHEN) CO.LTD., Shenzhen (CN)

(72) Inventors: Jing-Wei Li, Guangdong (CN); Sheng-Jie Ding, Guangdong (CN); Shin-Wen Chen, New Taipei (TW); Shuai-Peng Li, Shenzhen (CN)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 0 days.

(21) Appl. No.: 17/581,938

(22) Filed: Jan. 23, 2022

(65) Prior Publication Data

US 2023/0170780 A1   Jun. 1, 2023

(30) Foreign Application Priority Data

Nov. 30, 2021   (CN) .......................... 202111444098.6

(51) Int. Cl.
*H02K 41/03* (2006.01)
*H02K 41/035* (2006.01)
*G02B 7/04* (2021.01)

(52) U.S. Cl.
CPC ........... *H02K 41/0356* (2013.01); *G02B 7/04* (2013.01)

(58) Field of Classification Search
CPC .. H02K 5/00; H02K 5/02; H02K 5/10; H02K 5/24; H02K 33/00; H02K 33/04; H02K 41/00; H02K 41/03; H02K 41/035; H02K 41/0354; G03B 3/00; G03B 3/10; G03B 5/00; G03B 5/02; G03B 5/04; G03B 5/10; G02B 7/00; G02B 7/08; G02B 7/09
See application file for complete search history.

(56) References Cited

U.S. PATENT DOCUMENTS

| 2019/0011665 A1* | 1/2019 | Huang ...................... G02B 7/09 |
| 2019/0033552 A1* | 1/2019 | Lin ....................... G02B 13/009 |

FOREIGN PATENT DOCUMENTS

CN   104283367 A   1/2015

* cited by examiner

*Primary Examiner* — Tran N Nguyen
(74) *Attorney, Agent, or Firm* — ScienBiziP, P.C.

(57) ABSTRACT

A voice coil motor with extended and stabilized travelling distance for lens-focusing includes a housing, a first spring, a carrier, a second spring, and a base. The first and second springs, diametrically apart, are connected between an inner surface of the housing and a side of the carrier. The base includes an insulating base plate on the second spring and coupled to the housing, and a metal connecting member on a side of the insulating base plate and welded to the second spring, providing a reliable connection to the base. The risk of the second spring accidentally falling off is reduced.

18 Claims, 6 Drawing Sheets

VOICE COIL MOTOR

FIELD

The subject matter herein relates to cameras, especially relates to a voice coil motor.

BACKGROUND

A voice coil motor is normally used to move a lens in a camera module. With development, the requirements of voice coil motor in respect of travelling distance are higher, and the connection structure between a base and a spring in the voice coil motor needs to be strengthened. In the existing voice coil motor, the spring and the base are rivetted. However, the riveting process has problems of high material requirements, insufficient connection accuracy, high risk of damage to spring, and spring separation.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

Figure 1:
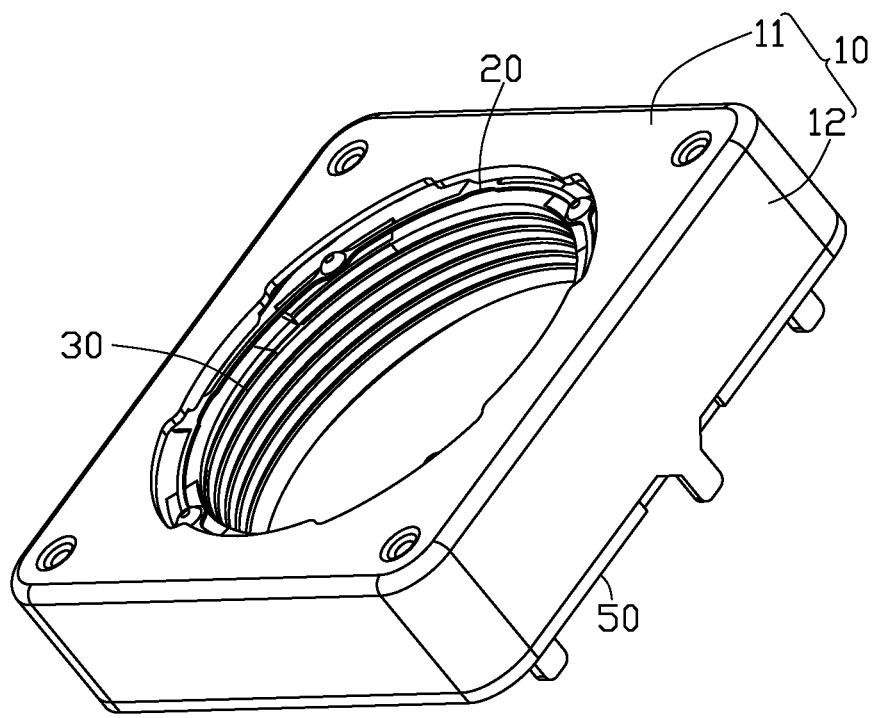
FIG. 1 is a schematic view of a voice coil motor in an embodiment according to the present disclosure.

Description of main components or elements:
Voice coil motor 100;
Housing 10;
Top wall 11;
Through hole 111;
Side wall 12;
First spring 20;
Outer structure 21;
Inner structure 22;
First positioning portion 23;
Second positioning portion 24;
Carrier 30;
Carrier bracket 31;
Receiving groove 311;
First mounting groove 312;
Second mounting groove 313;
Thread structure 314;
First conductive member 32;
Second conductive member 33;
Fixing member 34;
Second spring 40;
First component 41;
First welding portion 411;
Second welding portion 412;
Second component 42;
Third welding portion 421;
Fourth welding portion 422;
Base 50;
Insulating base plate 51;
Protruding portion 511;
Metal connecting member 52;
First connecting member 521;
First connecting portion 5211;
First terminal 5212;
Second connecting member 522;
Second connecting portion 5221;
Second terminal 5222;
Coil 60;
Magnetic member 70.

DETAILED DESCRIPTION

In order to make the above-mentioned objects, features, and advantages of the present application more obvious, a description of specific embodiments of the present application will be described with reference to the accompanying drawings. The present application can be implemented in many ways different from those described herein, and those skilled in the art can make similar improvements without violating the contents of the present application. Therefore, the present application is not to be considered as limiting the scope of the embodiments to those described herein.

Several definitions that apply throughout this disclosure will now be presented.

Unless otherwise defined, all technical and scientific terms used herein have the same meaning as commonly understood by one skilled in the art. The terms used in the present application herein are only for describing specific embodiments, and are not intended to limit the present application.

Figure 2:
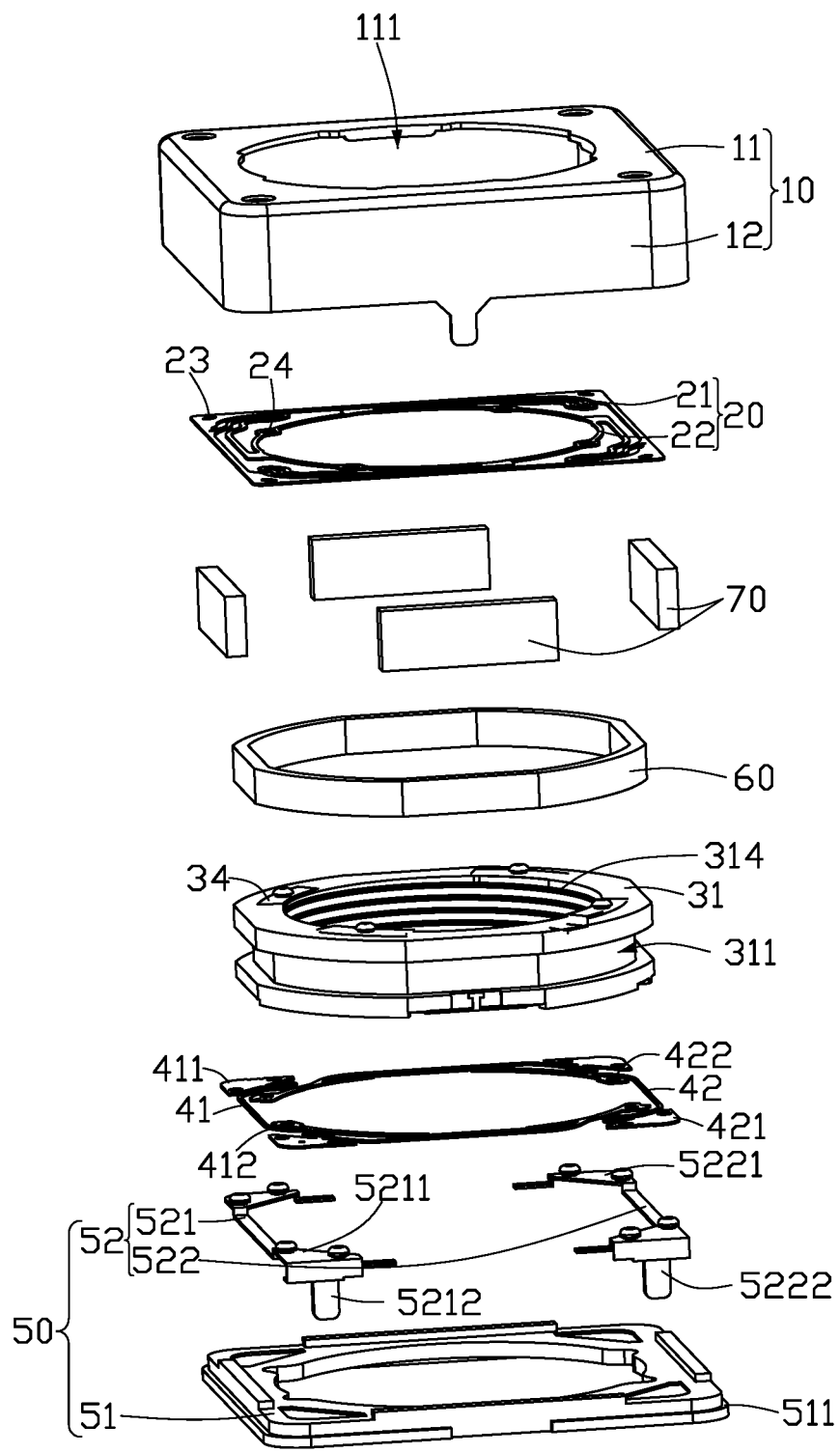
FIG. 2 is an exploded view of the voice coil motor of FIG. 1.

Referring to FIG. 1 and FIG. 2, in an embodiment of the present disclosure, a voice coil motor 100 includes a housing 10, a first spring 20, a carrier 30, a second spring 40, and a base 50. The first spring 20 is connected to an inner surface of the housing 10. The carrier 30 is received in the housing 10, and is configured to carry a coil 60. The first spiring 20 is further connected to a side of the carrier 30. The second spring 40 is received in the housing 10, and the second spring 40 is connected to other side of the carrier 30 away from the first spring 20. The base 50 includes an insulating base plate 51 and a metal connecting member 52. The insulating base plate 51 is positioned on a side of the second spring 40 away from the carrier 30, and the insulating base plate 51 is coupled to the housing 10. The metal connecting member 52 is positioned in part on a side of the insulating base plate 51 facing the second spring 40. The second spring 40 is welded with the metal connecting member 52, so as to improve the connection reliability between the second spring 40 and the base 50, thus the risk of the second spring 40 accidentally falling off from the base 50 is reduced.

Figure 3:
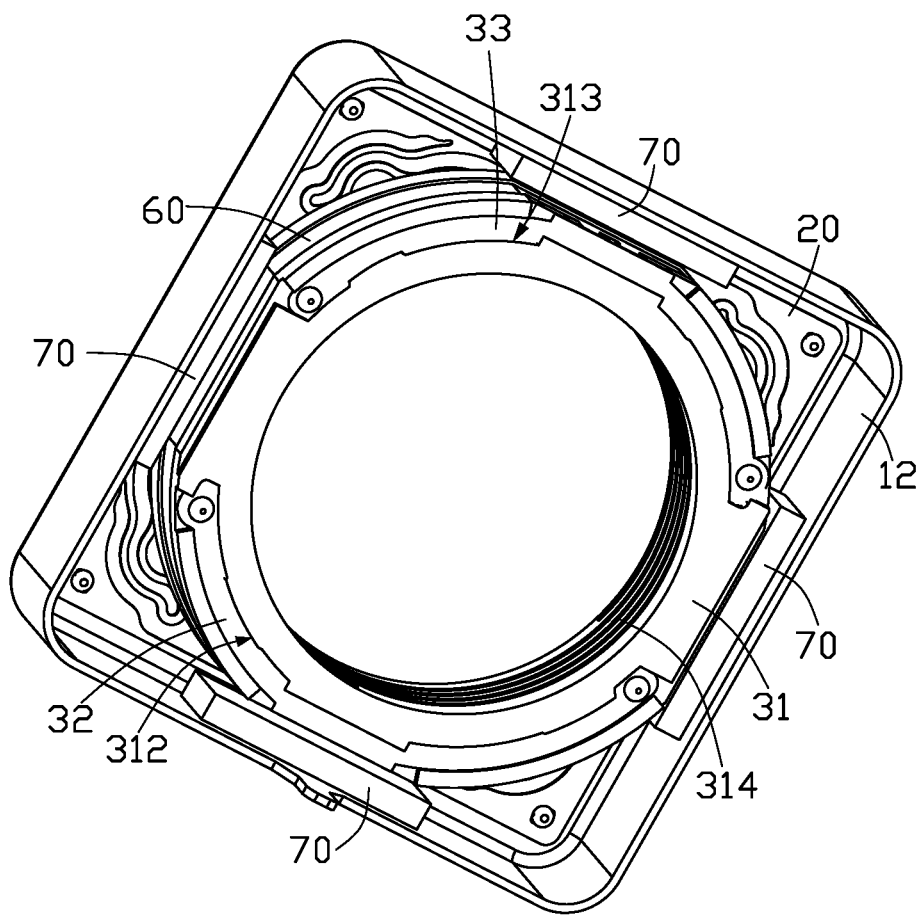
FIG. 3 is a schematic view of the voice coil motor of FIG. 1 without a base and a second spring.

Referring to FIG. 2 and FIG. 3, the housing 10 includes a top wall 11 and a side wall 12 arranged around the top wall 11. A through hole 111 is defined on the top wall 11. The carrier 30 and the coil 60 are arranged coaxially with the through hole 111. The voice coil motor 100 further includes a plurality of magnetic members 70, the magnetic members 70 are positioned in the housing 10, and are connected to an inner surface of the side wall 12. The magnetic members 70 are arranged around the coil 60. Changing the magnitude and direction of the current in the coil 60 makes the coil 60 move back and forth along an axial direction of the housing 10 under the magnetism of the magnetic members 70, so as to adjust the position of elements, such as a lens, arranged inside the carrier 30. The material of the housing 10 includes a metal material for shielding the magnetic field of the coil 60 and the magnetic members 70.

The first spring 20 is substantially in a ring structure in a square shape. The first spring 20 includes an outer structure 21 and an inner structure 22. The outer structure 21 and the inner structure 22 are connected in one piece. The outer structure 21 is roughly in a square structure, and the inner structure 22 is substantially in a ring structure. The outer structure 21 includes a first positioning portion 23. The inner structure 22 includes a second positioning portion 24. The first positioning portion 23 is welded with the top wall 11 of the housing 10. The second positioning portion 24 is welded with the carrier 30. Welding methods include, but are not limited to, laser welding, etc.

The carrier 30 includes a carrier bracket 31, a first conductive member 32, and a second conductive member 33. The carrier bracket 31 is a hollow cylindrical structure, and the carrier bracket 31 is made of insulating materials. A receiving groove 311 is defined on an outer side of the carrier bracket 31. The coil 60 is positioned in the receiving groove 311. A side of the carrier bracket 31 facing the second spring 40 defines a first mounting groove 312 and a second mounting groove 313. The first conductive member 32 is embedded in the first mounting groove 312, and the second conductive member 33 is embedded in the second mounting groove 313. A positive terminal of the coil 60 is electrically connected with the first conductive member 32, and a negative terminal of the coil 60 is electrically connected with the second conductive member 33. The second spring 40 is welded with the first conductive member 32 and the second conductive member 33. A thread structure 314 is defined on an inner side of the carrier bracket 31. The thread structure 314 is configured to accept optical elements, such as lenses, for installation.

Fixing members 34 are connected to a surface of the carrier bracket 31 facing the first spring 20. Materials of the fixing member 34 include metal materials. The second positioning portion 24 of the first spring 20 is welded with the fixing member 34. In an embodiment of the present disclosure, the quantity and positions of the fixing members 34 correspond one-to-one to the second positioning portion 24.

The first spring 20 and the second spring 40 on opposite side surfaces of the carrier 30 are used to reset the carrier 30 by pulling, so as to correct or position the elements installed in the carrier 30.

Figure 4:
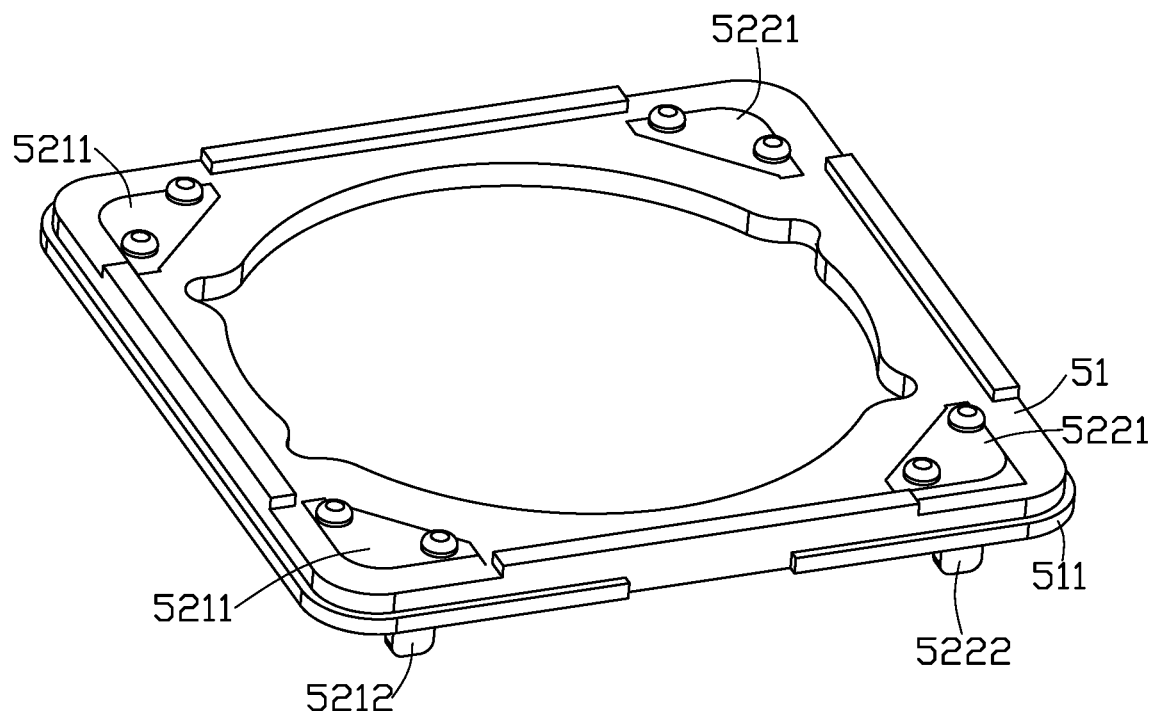
FIG. 4 is a schematic view of the base of the voice coil motor of FIG. 2.
Figure 5:
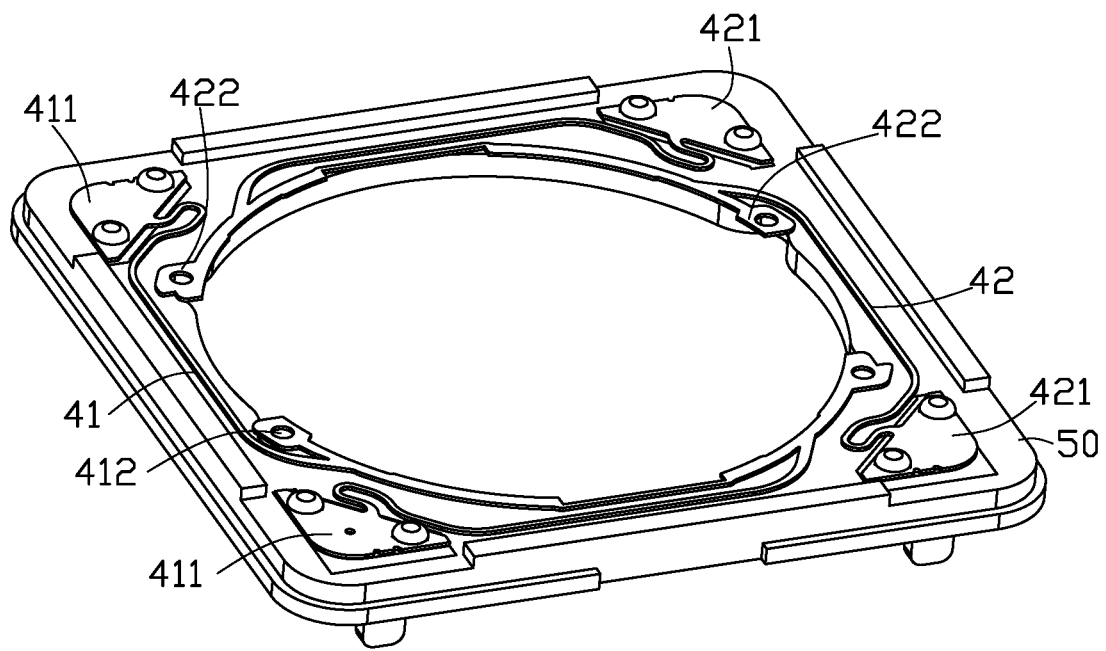
FIG. 5 is a schematic view of the base of FIG. 4 connected with the second spring.
Figure 6:
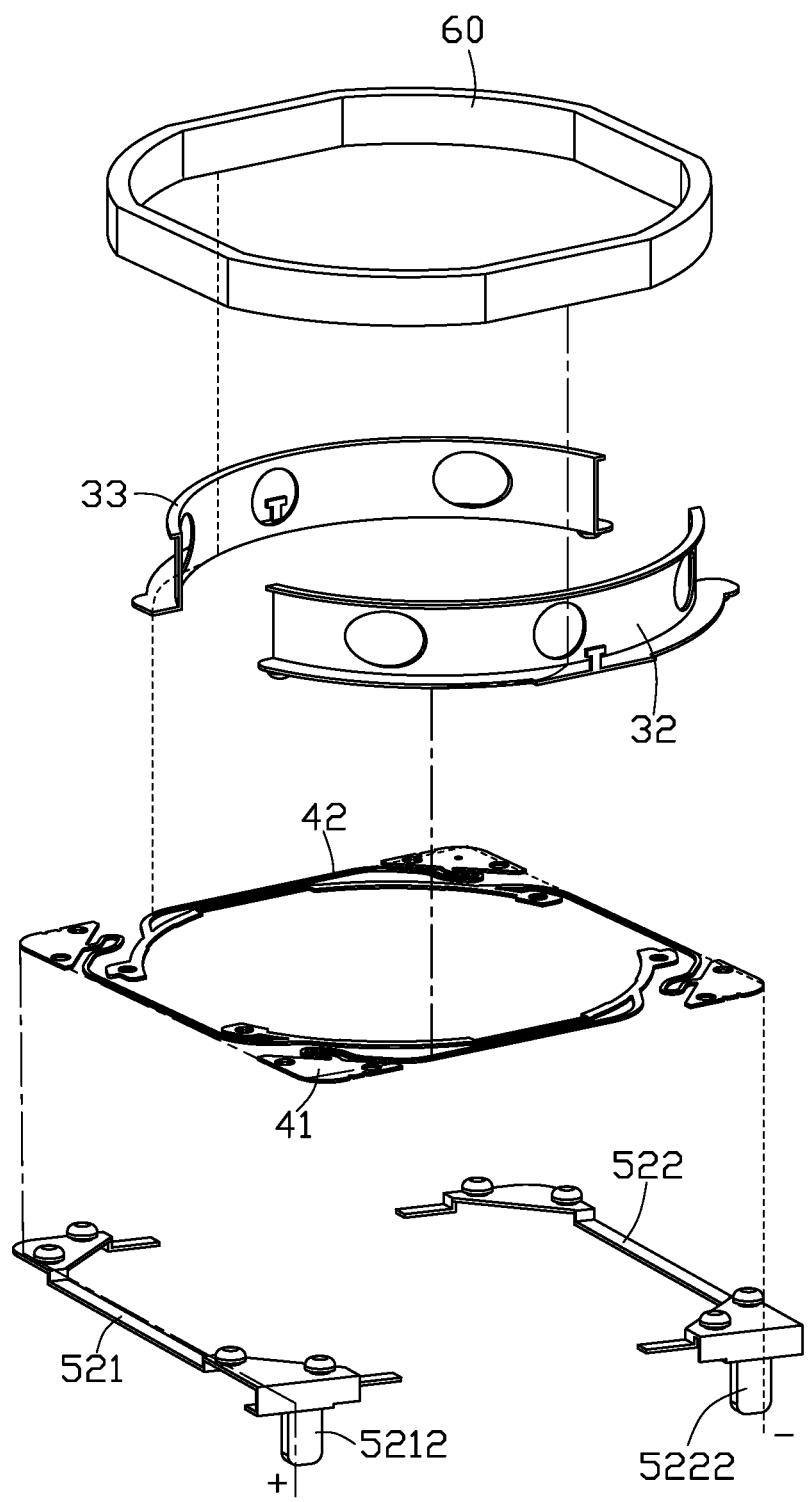
FIG. 6 is a schematic view of a coil, conductive members, the second spring, and a metal connecting member in the voice coil motor of FIG. 2.

Referring to FIGS. 4-6, the second spring 40 includes a first component 41 and a second component 42. The first component 41 is similar to the second component 42. The first component 41 and the second component 42 are substantially distributed in an angular symmetrical structure, and the first component 41 and the second component 42 are connected to a side of the base 50 facing the carrier 30. Materials of the first component 41 and the second component 42 include conductive materials. Furthermore, the first component 41 and the second component 42 are spaced apart, to maintain an insulation between the first component 41 and the second component 42. The first component 41 includes a first welding portion 411 and a second welding portion 412. The first welding portion 411 and the second welding portion 412 are spaced apart. The first welding portion 411 is welded with the first conductive member 32, and the second welding portion 412 is welded with the metal connecting member 52 of the base 50. The second component 42 includes a third welding portion 421 and a fourth welding portion 422, the third welding portion 421 and the fourth welding portion 422 are spaced apart. The third welding portion 421 is welded with the second conductive member 33, and the fourth welding portion 422 is welded with the metal connecting member 52 of the base 50.

The insulating base plate 51 of the base 50 is coupled to the side wall 12 of the housing 10. The insulating base plate 51 includes protruding portions 511, and the protruding portions 511 are located on a peripheral side of the insulating base plate 51. When the base 50 is coupled to the housing 10, the protruding portion 511 abuts the side wall 12. The metal connecting member 52 includes a first connecting member 521 and a second connecting member 522. Parts of the first connecting member 521 and the second connecting member 522 are embedded in the insulating base plate 51, and the first connecting member 521 is spaced apart from the second connecting member 522, to maintain insulation between the first connecting member 521 and the second connecting member 522. The first connecting member 521 includes a first connecting portion 5211. The first connecting portion 5211 is fixed on the side of the insulating base plate 51 facing the carrier 30. The second welding portion 412 is welded with the first connecting portion 5211. The second connecting member 522 includes a second connecting portion 5221. The second connecting portion 5221 is fixed on the side of the insulating base plate 51 facing the carrier 30. The first connection portion 5211 is spaced apart from the second connecting portion 5221. The fourth welding portion 422 is welded with the second connecting portion 5221. In an embodiment of the present disclosure, the welding method is laser welding. In other embodiments, the welding methods may include, but are not limited to, melting welding and hot-pressing welding.

Referring to FIG. 6, the first conductive member 32, the first component 41, and the first connecting member 521 are electrically connected by welding connection, and the first component 41 and the first connecting member 521 are electrically connected to the positive terminal of the coil 60 through the first conductive member 32. The second conductive member 33, the second component 42, and the second connecting member 522 are electrically connected by welding connection, and the second component 42 and the second connecting member 522 are electrically connected to the negative terminal of the coil 60 through the second conductive member 33. Therefore, a circuit structure is formed between the coil 60, the first conductive member 32, the second conductive member 33, the second spring 40, and the metal connecting member 52, which can optimize the internal circuit structure of the voice coil motor 100, reduce the number of wires set in the voice coil motor 100, save the internal space of the housing 10, and achieve the miniaturization of the voice coil motor 100.

Furthermore, the first connecting member 521 includes a first terminal 5212. The first terminal 5212 is electrically connected to the first connecting portion 5211, and is fixed on a side of the insulating base plate 51 away from the housing 10. The second connecting member 522 includes a second terminal 5222. The second terminal 5222 is electrical connected to the second connecting portion 5221, and is fixed on the side of the insulating base plate 51 away from the housing 10. The first terminal 5212 and the second terminal 5222 are spaced apart. The first terminal 5212 and the second terminal 5222 connect to an external circuit or power source.

Even though information and advantages of the present embodiments have been set fourth in the foregoing description, together with details of the structures and functions of the present embodiments, the disclosure is illustrative only.

Changes may be made in detail, especially in matters of shape, size, and arrangement of parts within the principles of the present embodiments to the full extent indicated by the plain meaning of the terms in which the appended claims are expressed.

The invention claimed is:

1. A voice coil motor comprising:
   a housing;
   a first spring, connected to an inner surface of the housing;
   a coil;
   a carrier, wherein the carrier is received in the housing and carries the coil, the first spring is connected to a side of the carrier;
   a second spring, wherein the second spring is received in the housing, and the second spring is connected to another side of the carrier away from the first spring;
   a base, wherein the base comprises an insulating base plate and a metal connecting member, the insulating base plate is positioned on a side of the second spring away from the carrier, and the insulating base plate is connected to the housing, the metal connecting member is positioned in part on a side of the insulating base plate facing the second spring, the second spring is welded with the metal connecting member;
   the carrier comprises a carrier bracket, a first conductive member, and a second conductive member; a receiving groove is defined on an outer side of the carrier bracket, the coil is positioned in the receiving groove, a side of the carrier bracket facing the second spring defines a first mounting groove and a second mounting groove, the first conductive member is embedded in the first mounting groove, and the second conductive member is embedded in the second mounting groove, the coil is electrically connected to the first conductive member and the second conductive member.

2. The voice coil motor of claim 1, wherein the carrier bracket is made of insulating materials.

3. The voice coil motor of claim 1, wherein a positive terminal of the coil is electrically connected with the first conductive member, and a negative terminal of the coil is electrically connected with the second conductive member.

4. The voice coil motor of claim 3, wherein the second spring comprises a first component and a second component, the first component and the second component are spaced apart, the first component is electrically connected to the first conductive member, and the second component is electrically connected to the second conductive member.

5. The voice coil motor of claim 4, wherein the first component comprises a first welding portion and a second welding portion, the first welding portion and the second welding portion are spaced apart, the first welding portion is welded with the first conductive member, and the second welding portion is welded with the metal connecting member of the base; the second component comprises a third welding portion and a fourth welding portion, the third welding portion and the fourth welding portion are spaced apart, the third welding portion is welded with the second conductive member, and the fourth welding portion is welded with the metal connecting member of the base.

6. The voice coil motor of claim 5, wherein the metal connecting member comprises a first connecting member and a second connecting member, parts of the first connecting member and the second connecting member are embedded in the insulating base plate, and the first connecting member is spaced apart from the second connecting member;
   the first connecting member comprises a first connecting portion, the first connecting portion is fixed on a side of the insulating base plate facing the carrier, the second welding portion is welded with the first connecting portion;
   the second connecting member includes a second connecting portion, the second connecting portion is fixed on the side of the insulating base plate facing the carrier, the first connection portion is spaced apart from the second connecting portion, the fourth welding portion is welded with the second connecting portion.

7. The voice coil motor of claim 6, wherein the first connecting member further comprises a first terminal, the first terminal is electrically connected to the first connecting portion, and the first terminal is fixed on a side of the insulating base plate away from the housing.

8. The voice coil motor of claim 7, wherein the second connecting member further comprises a second terminal, the second terminal is electrical connected to the second connecting portion, and the second terminal is fixed on the side of the insulating base plate away from the housing, the first terminal and the second terminal are spaced apart.

9. The voice coil motor of claim 1 wherein the carrier bracket is a hollow cylindrical structure, a thread structure is defined on an inner side of the carrier bracket.

10. The voice coil motor of claim 1 wherein the first spring comprises an outer structure and an inner structure, the outer structure and the inner structure are connected in one piece;
    the outer structure is connected to the housing, and the inner structure is connected to the carrier.

11. The voice coil motor of claim 10, wherein the outer structure comprises a first positioning portion, the inner structure comprises a second positioning portion, the first positioning portion is welded with the housing, and the second positioning portion is welded with the carrier.

12. The voice coil motor of claim 11, wherein a plurality of fixing members are connected to a surface of the carrier bracket facing the first spring, the second positioning portion of the first spring is welded with one of the plurality of fixing members.

13. The voice coil motor of claim 12, wherein materials of the plurality of fixing members comprise metal materials.

14. The voice coil motor of claim 12, wherein the inner structure comprises a plurality of second positioning portions, the plurality of fixing members correspond one-to-one to the plurality of second positioning portions.

15. The voice coil motor of claim 1, wherein the housing comprises a top wall and a side wall, the side wall is arranged around the top wall;
    a through hole is defined on the top wall, the carrier is arranged coaxially with the through hole.

16. The voice coil motor of claim 15, further comprising a plurality of magnetic members, wherein the plurality of magnetic members are arranged around the coil and connected to an inner surface of the side wall.

17. The voice coil motor of claim 15, wherein the insulating base plate includes protruding portions, and the protruding portions are located on a peripheral side of the insulating base plate, when the base is coupled to the housing, the protruding portions abut the side wall.

18. A voice coil motor comprising:
    a first spring;
    a second spring;
    a coil;
    a carrier;
    a housing;

a base, comparing an insulating base plate and a metal connecting member;

wherein the carrier is received in the housing, the first spring and the second spring are connected to two opposite ends of the carrier, the coil is movably connected to the carrier and positioned between the two opposite sides of the carrier, the insulating base plate is connected to an end of the housing, the metal connecting member is connected between the insulating base plate and the second spring, the second spring is welded with the metal connecting member;

the carrier comprises a carrier bracket, a first conductive member, and a second conductive member; a receiving groove is defined on an outer side of the carrier bracket, the coil is positioned in the receiving groove, a side of the carrier bracket facing the second spring defines a first mounting groove and a second mounting groove, the first conductive member is embedded in the first mounting groove, and the second conductive member is embedded in the second mounting groove, the coil is electrically connected to the first conductive member and the second conductive member; the second spring comprises a first component and a second component, the first component and the second component are spaced apart, the first component is electrically connected to the first conductive member, and the second component is electrically connected to the second conductive member.

\* \* \* \* \*